United States Patent

[11] 3,620,776

| [72] | Inventors | Abraham Rudolph Mishkin;<br>William Stephen Symbolik, both of<br>Marysville, Ohio |
|---|---|---|
| [21] | Appl. No. | 741,039 |
| [22] | Filed | June 28, 1968 |
| [45] | Patented | Nov. 16, 1971 |
| [73] | Assignee | Societe d'Assistance Technique Pour<br>Produits Nestle S. A.<br>Lausanne, Switzerland |
| [32] | Priorities | July 6, 1967 |
| [33] | | Switzerland |
| [31] | | 9569/67;<br>Oct. 9, 1967, Switzerland, No. 14068/67<br>Continuation-in-part of application Ser. No.<br>663,288, Aug. 25, 1965, now abandoned.<br>This application June 28, 1968, Ser. No.<br>741,039 |

[54] SPRAY DRYING PROCESS
10 Claims, 2 Drawing Figs.

[52] U.S. Cl. .................................................. 99/199,
159/48, 99/71, 34/5
[51] Int. Cl. .......................................................... A23,
B01d 1/16, F26b 3/12, B01d 1/00
[50] Field of Search............................................. 99/71, 77,
172, 199, 204, 206; 34/5, 92; 62/70, 74, 347;
239/424; 159/48

[56]    References Cited
UNITED STATES PATENTS

| 2,431,496 | 11/1947 | Natelson et al. ............ | 99/71 |
|---|---|---|---|
| 2,471,035 | 5/1949 | Hurd ............................ | 34/5 |
| 2,616,604 | 11/1952 | Folsom......................... | 53/22 |
| 3,281,950 | 11/1966 | Kautz............................ | 34/5 |
| 2,020,719 | 11/1935 | Bottoms....................... | 62/74 |
| 2,813,350 | 11/1957 | Berger........................... | 34/5 |
| 3,024,117 | 3/1962 | Barlow.......................... | 99/206 |
| 3,188,825 | 6/1965 | Van Olphen ................. | 62/347 X |
| 3,300,868 | 4/1965 | Anderwert ................... | 34/5 |
| 3,396,475 | 8/1968 | Schiebel....................... | 34/5 |
| 3,431,655 | 3/1969 | Grover et al.................. | 34/5 |
| 3,477,137 | 11/1969 | Van Gelder .................. | 34/5 |

FOREIGN PATENTS

| 952,920 | 3/1964 | Great Britain................ | 34/5 |

*Primary Examiner*—Norman Yudkoff
*Assistant Examiner*—J. Sofer
*Attorney*—Watson Leavenworth and Kelton ABSTRACT: A drying method for liquids is provided in which the liquid is sprayed, together with a gaseous fluid such as steam, into a low-pressure zone to cause freezing of the liquid in small particle form, and the frozen particles are then freeze-dried. The liquid may be a bioliggical solution, fruit juice or tea or coffee extract. An apparatus is also provided, comprising a freezing chamber, a two fluid nozzle simultaneously spraying liquid and gas into the chamber, a vacuum system with condensers for maintaining a low pressure within the chamber and a freeze-drying chamber.

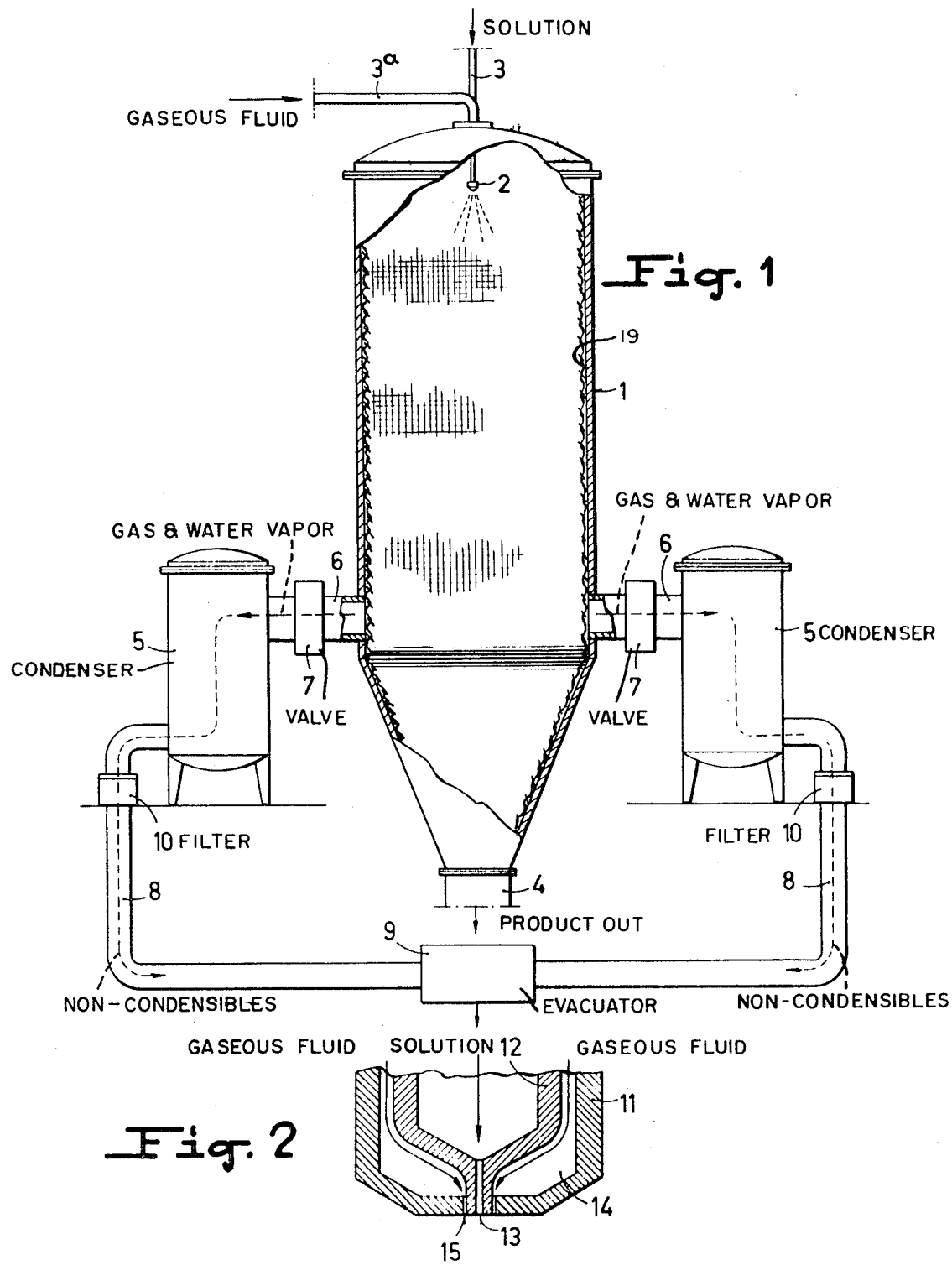

SPRAY DRYING PROCESS

This application is a continuation-in-part of copending application Ser. No. 663,288 Aug. 25, 1967, now abandoned. This application is a continuation-in-part of copending application Ser. No. 663,288 filed Aug. 25, 1967 now abandoned.

The present invention is concerned with the drying of various materials in solution or suspension in a liquid, notably extracts of different types, fruit juices, milk products and the like.

There exist processes for drying by spray-freezing, in which the liquid to be dried is sprayed in the form of fine droplets into a partially evacuated chamber in which the pressure may for example be of the order of 100 to 500 microns of mercury. On entering the low-pressure zone, the fine particles freeze during their fall and should normally be in solid state by the time they come into contact with a wall of the chamber. The frozen particles are then dried by subliming the liquid diluent in a suitable freeze-drying chamber.

In practice, operation of the process described above has certain disadvantages which have considerably restricted its industrial application. Thus, the formation of fine particles involves an atomization of the liquid under high pressure. The particles are formed in a stream which originally moves at high speed and since its path lies in a vacuum, there is no resistance to their falling motion within the chamber. As a consequence it frequently happens that the liquid particles hit one of the walls of the chamber before they have been frozen to a solid state and thus stick to the wall, which leads to losses in production. To overcome this particular problem, attempts have been made to lengthen the trajectory of the particles, as by increasing the height of the chamber or by spraying the liquid upwards rather than downwards. Neither of these improvements has proved to be entirely satisfactory for efficient industrial operation since dry products could only be obtained from dilute solutions generally not containing more than about 20 percent by weight of solids.

Problems of a different nature had also arisen in that the rapid cooling of the liquid on entering the vacuum caused it to freeze and frequently plug the nozzle through which it was sprayed.

An object of the present invention is to provide a method of spray-freezing and drying of liquids containing up to 60 percent by weight of solids.

A further object of the invention is to provide means for avoiding the plugging referred to above.

The present invention thus provides a process for drying liquids which comprises spraying the liquid into a zone of subatmospheric pressure in a current of gaseous fluid thereby to form frozen particles of said liquid and subsequently freeze-drying said frozen particles.

According to a feature of the present invention, the liquid is preferably sprayed through a two-fluid nozzle of the suction type together with the current of gaseous fluid and its path intersects that of the fluid at a short distance from the nozzle. In this manner the fluid breaks up the liquid jet into fine particles and at the same time prevents its lateral dispersion and inhibits the freezing of liquid around and on the nozzle.

The gaseous fluid may be any gas which is inert with respect to the liquid being dried, such as air, nitrogen or an inert gas. A condensable gas, especially steam, is preferred since it may be easily evacuated from the system by condensation on a cold surface thereby maintaining a suitably low pressure within the spraying zone. A gas which only condenses at very low temperatures is less desirable because its elimination would require a pumping system of very high capacity.

The present invention also provides an apparatus suitable for carrying out the process described herein, comprising a freezing chamber, means for maintaining subatmospheric pressure within said chamber, means for spraying a liquid into said chamber simultaneously with a current of a gaseous fluid, means for evacuating and condensing vapors generated within said chamber and at least one freeze-drying chamber.

A preferred embodiment of the apparatus according to the present invention is shown in the accompanying drawings in which:

FIG. 1 is a schematic elevation, partly in section, of the freezing chamber with ancillary equipment;

FIG. 2 is a magnified sectional view of a spray nozzle.

As shown in FIG. 1 the apparatus comprises a vertical freezing chamber 1 of metal construction, with cylindrical walls and conical bottom. The dimensions of the chamber may, for example, be 3 meters in diameter and 10 meters in height.

At the upper end of the freezing chamber is mounted a spray system comprising a two-fluid nozzle 2 and feed lines 3 and 3$^a$ for supplying, respectively, the solution to be dried and the gaseous fluid which is preferably steam. At the bottom of the chamber is a hopper 4 if the chamber is directly connected to a freeze-drying chamber or an air-lock if the freeze-drying chamber is not directly connected. This chamber may be of any desired type or construction, and in particular, it may be a continuous or batch unit, including the usual ancillary equipment such as condensers, heating platens, vacuum pumps and the like.

Ducts 6 connect the lower part of the chamber to condensers 5, disposed symmetrically. These may be two, four or six in number, depending on their dimensions and those of the chamber. A valve 7 is mounted on each duct so that each condenser may be individually isolated for cleaning or defrosting without necessarily breaking the vacuum within the chamber.

The condensers 5 are also connected by ducts 8 to a vacuum system 9 comprising one or more pumps of adequate capacity to maintain an absolute pressure within the freezing chamber of 50–500 microns. When steam is used as the gaseous fluid, the pumping system need not be excessively large since the water vapor formed can be condensed out of the system and need not be pumped. A filter 10 is mounted on each duct 8 between the condenser and vacuum system to trap any fine particles which may have been sucked out of the chamber.

Freezing of the particles of liquid formed at the upper end of the chamber 1 should be rapid. When the liquid to be dried is a coffee extract containing 30 to 50 percent by weight of dissolved coffee solids, the particles should be frozen solid after a free fall lasting about 0.5 to 1.5 seconds. Particles of a tea extract of similar concentration require about 0.5 to 1.0 seconds. Furthermore, in order to obtain an even dispersion of the liquid, that is, a uniform particle size, it is generally necessary to spray at a high pressure. This would lead to jet of high-velocity particles, directed downwardly and encountering no notable resistance during the fall. Under these conditions, the time of fall within a chamber of reasonable dimensions would be too short to ensure complete freezing of all particles.

According to the present invention, however, the liquid is sprayed at a relatively low pressure, and dispersion is obtained by the action of a current of gaseous fluid, preferably steam, which is sprayed from the same nozzle as the liquid. The fluid, for example steam, is sprayed in the form of an annular curtain surrounding the liquid jet, and the paths of the jets meet at a short distance from the nozzle, and the liquid jet is broken up in to fine particles on impact with the jet of steam. The particles then have a sufficiently long path of fall within the chamber 1 to ensure their complete freezing.

FIG. 2 shows a preferred spray nozzle. It comprises an outer sleeve 11 which surrounds a central spray jet 12. The jet 12 is fed with solution through line 3 which is sprayed through orifice 13, for example at a pressure of 0.2 to 0.4 kg./cm.$^2$, in the form of a conical sheet. Steam, supplied to the nozzle by line 3$^a$, passes through the annular space 14 between the sleeve 11 and the spray jet 12, for example at a pressure between 0.5 and 2.5 kg./cm.$^2$, and enters the chamber through the annular orifice 15. As shown in the drawing, the orifices 13 and 15 lie in the same horizontal plane.

According to a feature of the present invention, the annular curtain of gaseous fluid is injected into the chamber more or less vertically and thus it meets the conical sheet of liquid at a short distance below the nozzles which prevents the liquid from spreading outwards in the direction of the side walls of the chamber. Furthermore, this particular arrangement of the steam and liquid jets prevents formation of frozen liquid deposits at the nozzle opening which would lead to an irregular particle size and ultimate plugging of the jet.

In order to ensure that no liquid particles stick to the inside walls of chamber 1, a permeable flexible membrane 19, for example of nylon net, may be disposed within the chamber. Such a lining may be shaken to dislodge any attached particles, and it also serves a filter preventing particles from entering the ducts 6.

In operating the process, three factors have to be considered in order to determine optimum conditions of freezing, notably the absolute pressure within the chamber and the solids concentration and temperature of the solution being dried.

The absolute pressure within the chamber, measured in microns of mercury, should be maintained below the vapor pressure of the eutectic present in the solution which freezes at the lowest temperature. In general, the pressure will usually be below 500 microns, but may be lower in certain cases. Thus, for an aqueous solution containing 30 to 50 percent by weight of soluble solids of roasted coffee, the pressure is preferably maintained at about 100 to 150 microns of mercury. Under these conditions, the condenser temperature should desirably be maintained between −55 and −60° C.

It has further been observed that high-temperature spraying of aqueous solutions of low concentration of soluble coffee or tea solids leads to the production of low-density particles which, in turn, have a light color. It is consequently preferred to spray the liquid at temperatures of 50 to 60° C.

The density of the finished product may be adjusted by incorporating a small amount of a gas, such as nitrogen or carbon dioxide in the spray solution, but in general this is not necessary.

Sublimation of the frozen diluent present in the solution to be dried commences in the freezing chamber and the resulting vapors are evacuated from the chamber and condensed, together with those generated when the liquid boils on first encountering the low pressure within the chamber. Sublimation of the diluent is completed in a freeze-drying chamber. When the freeze-drying installation is directly connected to the freezing chamber, some of the ancillary equipment, notably condensers 5 and vacuum system 9 may be shared by both the freezing and the freeze-drying chambers.

The process and apparatus described herein are especially suitable for drying sensitive materials such as aromatic extracts, milk products, fruit juices, biological solutions and the like. The process and apparatus are especially suited for the drying of aqueous tea and coffee extracts containing 20 to 60 percent by weight of soluble solids.

The following Examples are given for the purposes of illustration only:

Example 1

An aqueous solution containing 45 percent by weight of soluble roasted coffee solids is preheated to a temperature of about 60° C. and sprayed through a two-fluid nozzle (Spraying Systems Co, Bellwood, Illinois, No. 60.100) into a freezing chamber in which an absolute pressure of 100 microns of mercury is maintained. The nozzle is placed at 0.76 meters below the top of the chamber, which has a diameter of about 3 meters. The coffee solution is sprayed at a pressure of 0.35 kg./cm.$^2$ simultaneously with steam at a pressure of about 2.1 kg./cm.$^2$. Under these spraying conditions liquid particles or globules between about 50 and 300 microns in diameter are produced. These particles are frozen to a solid state by the time they arrive at the bottom of the freezing chamber from which they are removed through a suitable air-lock. The frozen product is then distributed on trays and dried in a batch freeze-drying unit. The resulting dry coffee extract has attractive dark brown color and a density of 190 g./liter.

Example 2

A concentrated extract containing 65 percent by weight of soluble tea solids is diluted to a concentration of 43 percent by addition of an aromatic tea distillate. This solution is preheated to about 55° C. and sprayed through a two-fluid nozzle (Spraying Systems, No. 60.100) into a freezing chamber as described in example 1. The tea solution is sprayed at a pressure of 0.21 kg./cm.$^2$, simultaneously with steam at a pressure of 0.7 kg./cm.$^2$. The absolute pressure within the chamber is maintained at 180 microns of mercury.

A small quantity of gaseous carbon dioxide is incorporated in the liquid extract to adjust the density of the finished product. The particles produced by spraying are frozen solid when they reach the bottom of the chamber after a fall of some 10 meters. They are collected in a hopper and distributed automatically on the transporter of a continuously functioning freeze-drying unit which is directly connected to the freezing chamber. The diluent is sublimed and the product reaches the end of the transporter in the form of a freeze-dried tea extract containing around 3 percent by weight of moisture. It is removed through an air-lock and packed in suitable containers. The produce is slightly flaky in appearance and has an attractive color; on reconstitution with water, the product has a flavor and aroma which are superior to conventional spray-dried tea extracts.

Example 3

A liquid potato soup mix containing 12.5 percent by weight of total solids is preheated to 33° C. and sprayed through a two-fluid nozzle of the suction type (Spraying Systems, No. 2850) into a freezing chamber in which an absolute pressure of 150 microns of mercury is maintained. The liquid mix is sprayed at a pressure of 7.7 kg./cm.$^2$ simultaneously with air at 2.1 kg./cm.$^2$. The nozzle is located at about 0.76 meters below the top of the chamber which is about 3 meters in diameter and 10 meters high. The frozen particles are removed from the chamber through an air-lock and freeze-dried in a batch freeze-drying unit. The dried product has a density of 167 g./l. and a moisture content of 4.98 percent. On reconstitution with water it gives a pleasant-flavoured potato soup.

We claim:

1. A process for drying solids-containing liquids which comprises spraying a stream of the liquid into a freezing zone of subatmospheric pressure while simultaneously spraying a current of gaseous fluid into said zone and against said stream of liquid to move said stream away from its point of introduction into said zone and to break up said stream and thereby form frozen particles of said liquid, and subsequently freeze-drying said frozen particles.

2. A process according to claim 1 in which the gaseous fluid is air, an inert gas or steam.

3. A process according to claim 1 in which the liquid and the gaseous fluid are sprayed together through a two-fluid nozzle of the suction type.

4. A process according to claim 3 in which liquid and gaseous fluid are sprayed codirectionally from said nozzle in paths which intersect at a short distance from the nozzle.

5. A process according to claim 4 in which the gaseous fluid is sprayed as an annular curtain around the liquid which is sprayed as a conical sheet.

6. A process for drying solids-containing liquids which comprises simultaneously spraying into a freezing zone of subatmospheric pressure codirectionally from a two-fluid nozzle of the suction type, a conical stream of the liquid and an annular current of steam encircling said stream, said current of steam intersecting the path of said stream a short distance from the nozzle to move said stream away from said nozzle and to break up said stream and thereby form frozen particles of said liquid, and subsequently freeze-drying said frozen particles.

7. A process according to claim 1 which comprises spraying an aqueous solution containing 20 to 60 percent by weight of soluble solids of roasted coffee into a zone which is maintained at an absolute pressure not exceeding 150 microns of mercury, said solution being sprayed into said zone at a temperature between 50° and 60° C. while simultaneously spraying a current of steam against said solution.

8. A process according to claim 7 in which said solution contains 30 to 50 percent by weight of soluble coffee solids and is sprayed into a zone which is maintained at an absolute pressure not exceeding 100 microns.

9. A process according to claim 1 which comprises spraying an aqueous solution containing 20 to 60 percent by weight of soluble solids of tea into a zone which is maintained at an absolute pressure not exceeding 180 microns of mercury, said solution being sprayed into said zone at a temperature between 50° and 60° C. while simultaneously spraying a current of steam against said solution.

10. A process according to claim 9 in which said solution contains 30 to 50 percent by weight of soluble tea solids and is sprayed into a zone which is maintained at an absolute pressure not exceeding 100 microns.

* * * * *